United States Patent
Geiger

(10) Patent No.: US 6,240,602 B1
(45) Date of Patent: *Jun. 5, 2001

(54) DUAL SPACING CLAMP TIE

(75) Inventor: Gerard G. Geiger, Jackson, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/396,027

(22) Filed: Sep. 15, 1999

Related U.S. Application Data

(63) Continuation-in-part of application No. 08/928,933, filed on Sep. 12, 1997.

(51) Int. Cl.⁷ .......................... A44B 21/00; B65D 63/00
(52) U.S. Cl. .................... 24/16 PB; 24/17 AP; 248/74.3
(58) Field of Search ............................. 24/16 PB, 17 AP, 24/60.5 P; 248/74.3

(56) References Cited

U.S. PATENT DOCUMENTS

| | | | |
|---|---|---|---|
| 2,432,492 | * 12/1947 | Tinnerman | 248/74.3 |
| 3,588,011 | * 6/1971 | Peres | 248/74.3 |
| 3,632,071 | * 1/1972 | Cameron | 24/16 PB |
| 3,654,669 | * 4/1972 | Fulton | 248/74.3 |
| 4,910,831 | * 3/1990 | Bingold | 24/16 PB |
| 4,993,669 | 2/1991 | Dyer . | |
| 5,088,158 | * 2/1992 | Burkholder | 24/16 PB |
| 5,098,054 | 3/1992 | Dyer . | |
| 5,148,576 | 9/1992 | Dyer . | |
| 5,157,815 | 10/1992 | Dyer . | |
| 5,159,728 | * 11/1992 | Bingold | 24/16 PB |
| 5,160,811 | 11/1992 | Ritzmann . | |
| 5,216,784 | 6/1993 | Dyer . | |
| 5,301,917 | 4/1994 | Dyer . | |
| 5,304,188 | * 4/1994 | Marogil | 24/16 PB |
| 5,746,401 | * 5/1998 | Condon | 248/74.3 |
| 5,772,258 | 6/1998 | Dyer et al. . | |
| 5,820,083 | 10/1998 | Geiger . | |
| 5,884,367 | * 3/1999 | Teagno et al. | 24/16 PB |
| 5,890,265 | 4/1999 | Christian et al. . | |
| 5,937,488 | 8/1999 | Geiger . | |
| 5,966,781 | * 10/1999 | Geiger | 24/16 PB |
| 6,003,208 | 12/1999 | Christian et al. . | |

FOREIGN PATENT DOCUMENTS

2129863 * 5/1984 (GB) ................................ 24/16 PB

* cited by examiner

Primary Examiner—Victor N. Sakran
(74) Attorney, Agent, or Firm—Ryan Kromholz & Manion, S.C.

(57) ABSTRACT

A dual spacing clamp tie includes a locking head and two flexible straps extending outwardly in opposite directions from the locking head. The straps are insertable through the locking head to form two, spaced loops that can be used to secure items in spaced, parallel relationship to each other. A pair of releasable pawls in the locking head secures the straps around the items to be secured. An aperture through the locking head is provided for securing the dual spacing clamp tie to a mounting structure such as a threaded stud. An additional pawl mechanism is provided within the aperture to secure the clamp tie to the mounting stud. A nut or other fastener can be used to further secure the clamp tie to the mounting stud. If desired, the additional pawl mechanism can be configured to permit insertion of the mounting element into the aperture from one end only. The locking head may be bifurcated wherein one of the halves contains the aperture for securing the dual spacing clamp tie to the mounting structure.

30 Claims, 10 Drawing Sheets

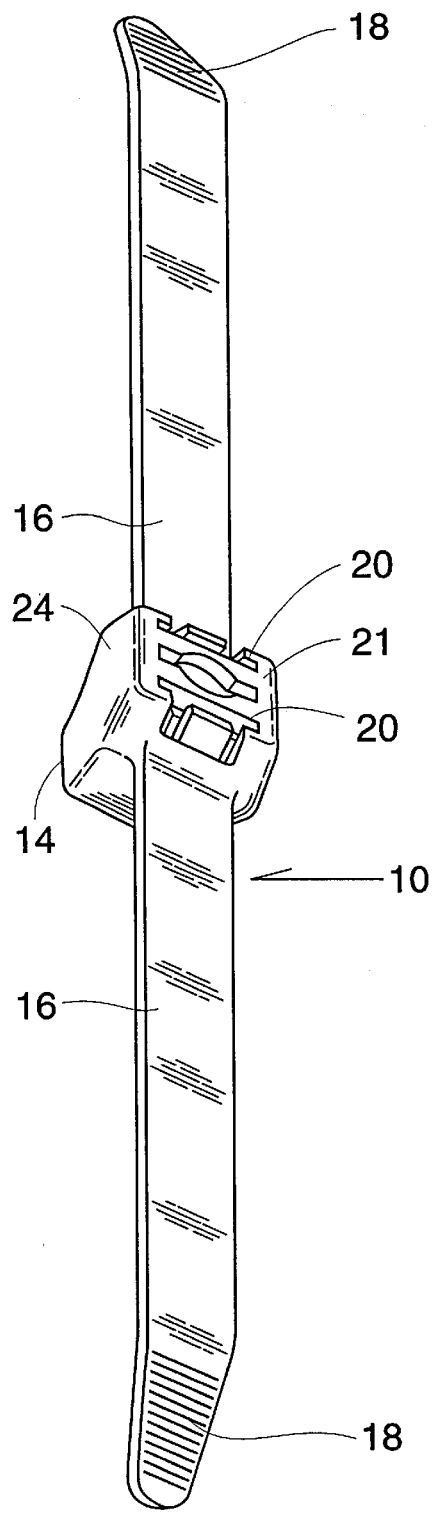
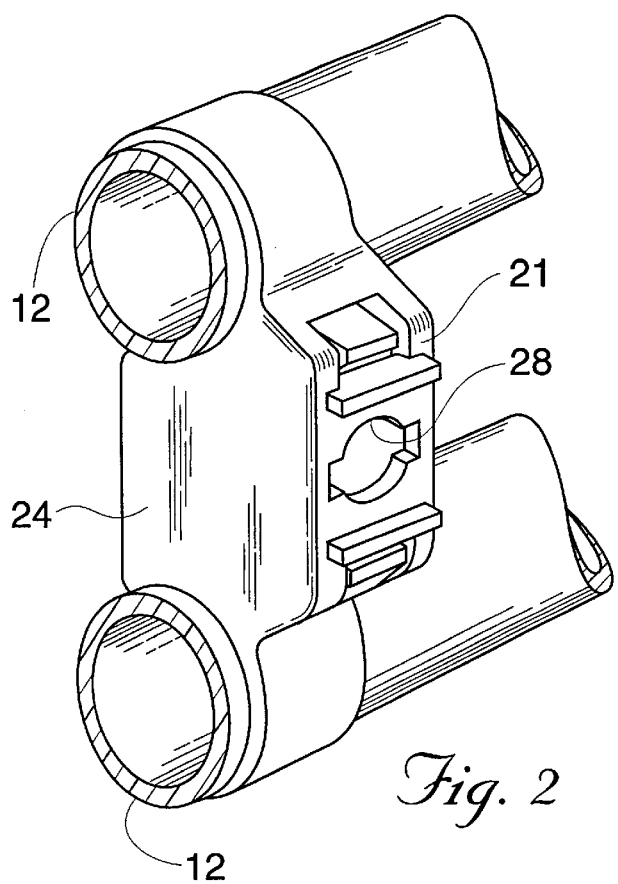
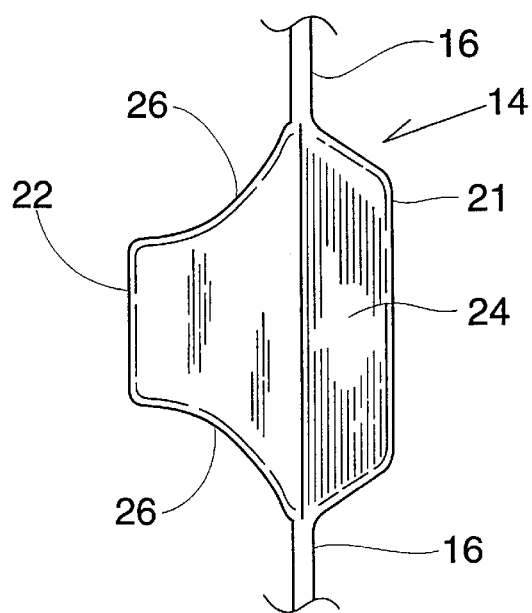
Fig. 1
Fig. 2
Fig. 3

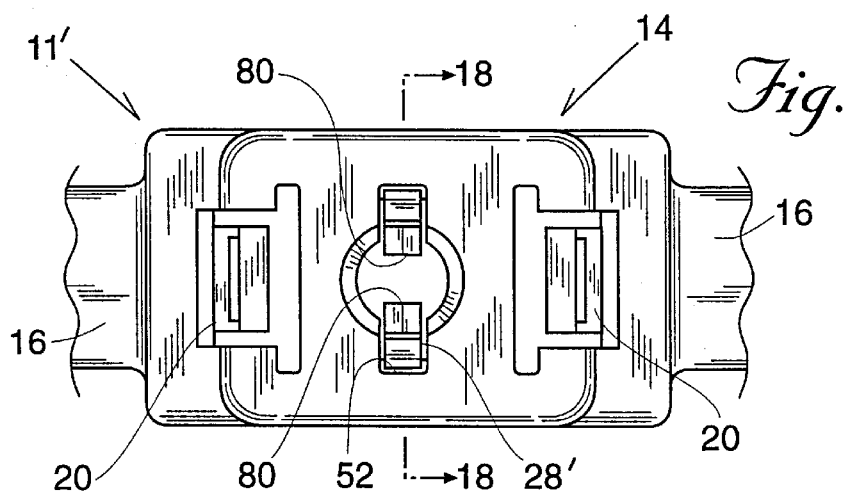
Fig. 17
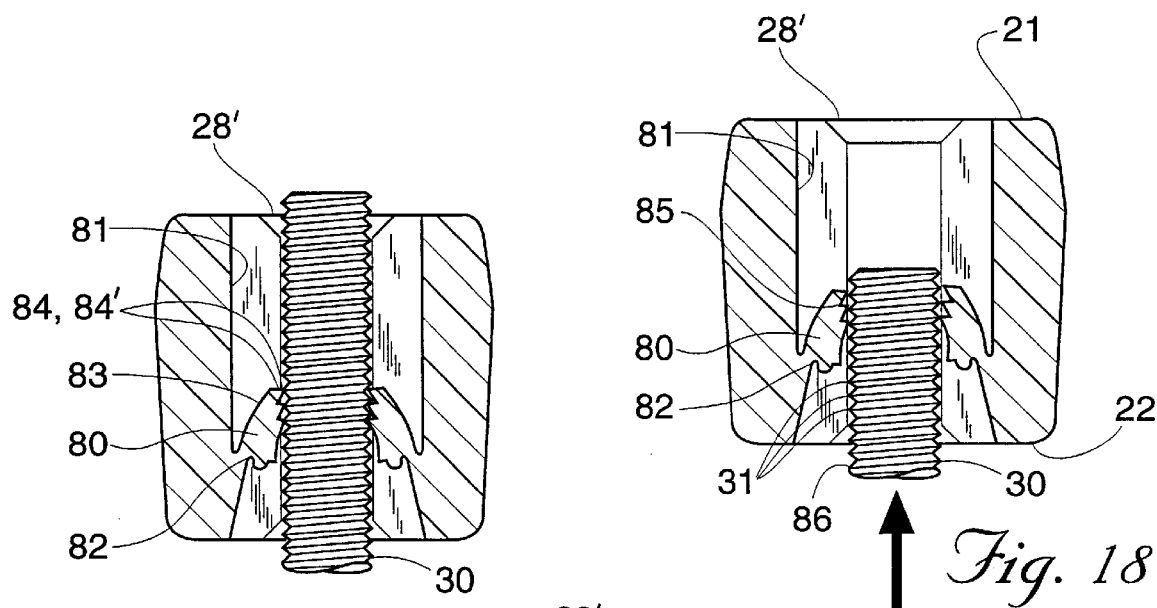
Fig. 18
Fig. 19
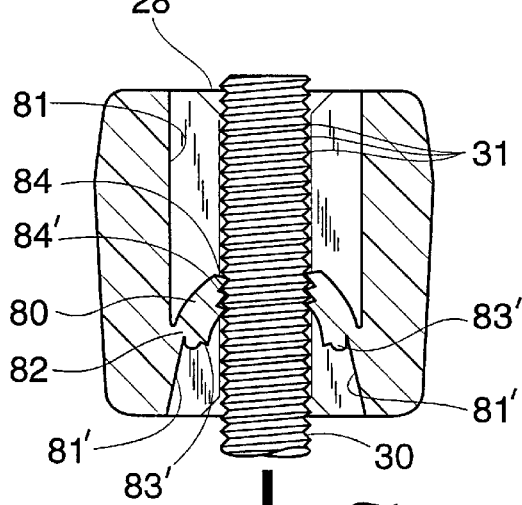
Fig. 20

DUAL SPACING CLAMP TIE

RELATED APPLICATION

This is a continuation-in-part of co-pending U.S. patent application Ser. No. 08/928,933 Filed Sep. 12, 1997 and commonly owned by the assignee hereof.

BACKGROUND OF THE INVENTION

This invention relates generally to devices for securing elongate items, such as wires, cables, hoses, tubing, conduits etc. More particularly, the invention relates to clamp ties that secure such items in spaced, parallel relationship with each other or in spaced, non-parallel relationship with each other.

Various devices have been developed for securing elongate items such as wires, cables, hoses, tubing, conduits, etc. Among these devices are clamps that secure a pair of such items in spaced, parallel relationship with each other. Examples of such clamps are shown in U.S. Pat. Nos. 3,654,669 and 3,981,048.

Although effective in securing elongate items to each other, neither of the devices shown in these patents made provision for securing the items not only to themselves but to a supporting structure as well. Such need arises, for example, in the trucking, automotive or other industry wherein a pair of hoses, lines or cables are to be spaced from each other and can be mounted to a vehicle frame member. Furthermore, prior devices did not include structure for maintaining a definite, preselected spacing between the items that were secured to each other. Such devices were ineffective in maintaining a desired spacing sufficient to avoid chaffing, heat transfer electromagnetic field transfer or other adverse consequences of insufficient spacing. The devices simply secured the items together without regard for the resulting spacing.

SUMMARY OF THE INVENTION

The invention provides a dual spacing clamp tie having a locking head, a pair of straps extending in opposite directions from the locking head, a first pawl mechanism within the locking head for engaging and retaining one of the straps, and a second pawl mechanism within the locking head for engaging and retaining the other of the straps.

The invention also provides a dual spacing clamp tie including a locking head having a pair of arcuate surfaces for engaging items to be secured, a pair of straps extending in opposite directions from the locking head and adjacent the arcuate surfaces, a first pawl mechanism within the locking head for engaging and retaining one of the straps, and a second pawl mechanism within the locking head for engaging and retaining the other of the straps.

The invention also provides a dual spacing clamp tie for securing elongate items adjacent a mounting member in spaced substantially parallel relationship to each other. The dual spacing clamp tie includes a locking head having a pair of arcuate surfaces for engaging the items and further having an aperture for receiving therethrough the mounting member. The dual spacing clamp tie further includes a pair of straps extending in opposite directions from the locking head and insertable through the locking head to form a loop in conjunction with each of the arcuate surfaces. A first pawl mechanism is provided within the locking head for engaging and retaining one of the straps in looped relationship with the locking head and one of the arcuate surfaces. A second pawl mechanism is provided within the locking head for engaging and retaining the other of the straps in looped relationship with the locking head and the other of the arcuate surfaces. The aperture is shaped and dimensioned to frictionally engage the mounting member to thereby retain the dual spacing clamp tie adjacent the mounting member until, if desired, a more permanent fastener can be applied.

The invention also provides a dual spacing clamp tie for securing elongate items adjacent a mounting member in spaced substantially parallel relationship to each other. The dual spacing clamp tie includes a locking head having a pair of arcuate surfaces for engaging the items and further having an aperture for receiving therethrough the mounting member. The dual spacing clamp tie further includes a pair of straps extending in opposite directions from the locking head and insertable through the locking head to form a loop in conjunction with each of the arcuate surfaces. A first pawl mechanism is provided within the locking head for engaging and retaining one of the straps in looped relationship with the locking head and one of the arcuate surfaces. A second pawl mechanism is provided within the locking head for engaging and retaining the other of the straps in looped relationship with the locking head and the other of the arcuate surfaces. A third pawl mechanism is provided within the aperture for engaging and retaining the mounting element within the aperture.

The invention also provides a dual spacing clamp tie comprising a locking head having a pair of arcuate surfaces for engaging items to be secured and having an aperture for receiving a mounting element therethrough, a pair of straps extending in opposite directions from the locking head and adjacent the arcuate surfaces, a first pawl mechanism within the locking head for engaging and retaining one of the straps, a second pawl mechanism within the locking head for engaging and retaining the other of the straps, and structure within the aperture for facilitating insertion of the mounting element into the aperture from one end only and for engaging the mounting member to secure the locking head to the mounting element.

The invention also provides a dual spacing clamp tie for securing elongate items adjacent a mounting member in spaced substantially parallel relationship to each other, comprising a locking head having a pair of arcuate surfaces for engaging the items and further having an aperture for receiving therethrough the mounting member, a pair of straps extending in opposite directions from the locking head and insertable through the locking head to form a loop in conjunction with each of the arcuate surfaces, a first pawl mechanism within the locking head for engaging and retaining one of the straps in looped relationship with the locking head and one of the arcuate surfaces, a second pawl mechanism within the locking head for engaging and retaining the other of the straps in looped relationship with the locking head and the other of the arcuate surfaces, and a third pawl mechanism within the aperture for permitting movement of the mounting element in a bi-directional direction therethrough while resisting movement of the mounting element in the opposite direction and for engaging and retaining the mounting element within the aperture.

In one embodiment, the first and second pawl mechanisms are releasable.

In one embodiment, the aperture is smooth-walled and undersized so that the dual spacing clamp tie is held in position on the mounting element through a friction or interference fit.

In one embodiment, the third pawl mechanism includes triangularly shaped pawls carried at the ends of elongate hinges within the aperture.

In one embodiment, the dual spacing clamp tie comprises a single unitary structure.

In one embodiment, the dual spacing clamp tie is formed of injection molded plastic.

The present invention further provides structure within the mounting element aperture wherein the mounting element aperture includes various novel means for engaging the mounting element.

Still another embodiment of the invention provides a bifurcated locking head defining two rotationally relative members, wherein one of the members includes the aforementioned mounting head aperture having structure for engaging the mounting element. This structure provides spacing for non-parallel, crossing elongated items or bundles. Any angle of the crossing elongated items can be accommodated by adjusting the locking head members.

DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

FIG. 1 is a perspective view of a dual spacing clamp tie embodying various features of the invention.

FIG. 2 is a perspective view of a dual spacing clamp tie installed on a pair of hoses.

FIG. 3 is a partial side view of the locking head portion of the dual spacing clamp tie shown in FIGS. 1 and 2.

FIG. 17 is a top plan view of an alternate embodiment dual spacing clamp tie having structure for facilitating one-way installation of the clamp tie onto a mounting stud or other fastener.

FIG. 18 is a cross-sectional view of the alternate embodiment taken along line 18—18 of FIG. 17 and illustrating initial engagement of the mounting element in the form of a threaded stud, with the locking pawls.

FIG. 19 is a cross-sectional view of the alternate embodiment taken along line 18—18 of FIG. 17, and indicating reverse axial movement of the threaded mounting stud and its relationship with the pawls of FIG. 18.

FIG. 20 is a cross-sectional view of the alternate embodiment taken along line 18—18 of FIG. 17, and indicating further reverse axial movement of the stud and with the teeth of the pawls of FIGS. 18–19 preventing continued relative movement thereof.

DETAILED DESCRIPTION

Figure 4:
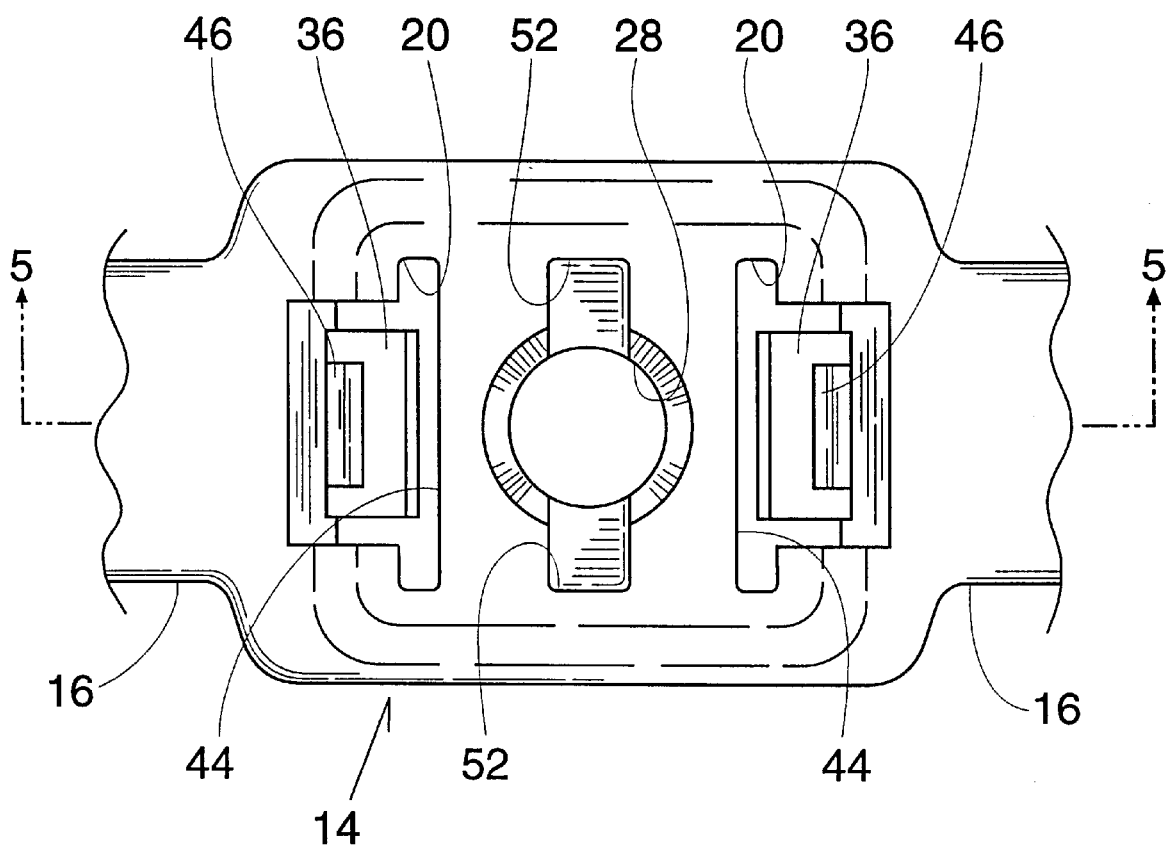
FIG. 4 is a top plan view of the locking head shown in FIG. 3.

A dual spacing clamp tie 10 embodying various features of the invention is shown in FIGS. 1–5. As best seen in FIG.

2, the dual spacing clamp tie 10 functions to hold two elongate items 12 in spaced, substantially parallel relationship with each other. In the example shown, the items 12 are hoses. It will be appreciated, however, that the particular items secured by the dual spacing clamp tie 10 are not critical and can comprise, wires, cables, tubes, conduits, fiber optics, vines or other such items as well as bundles made up of multiple ones of such items. The dual spacing clamp tie could even be used for attaching small trees and plants to poles.

Prior to use, the dual spacing clamp tie 10 appears as shown in FIG. 1. As illustrated, the dual spacing clamp tie 10 includes a locking head 14 centrally disposed between a pair of elongate straps 16 that extend outwardly in opposite directions from the locking head 14.

The straps 16 are each preferably of substantially uniform width and thickness except at their ends where each tapers into a tie tail portion 18. A pair of spaced, substantially parallel slots 20 are formed through the locking head 14. Each slot 20 is shaped and dimensioned to allow the passage of the adjacent strap 16 therethrough. The items 12 to be secured by the dual spacing clamp tie 10 are secured by looping one of the straps 16 around the item 12 and inserting the strap 16 through an adjacent slot 20 in the locking head 14. The straps 16 are then pulled to tighten them around the items 12. The tapered tie tail 18 of each strap 16 facilitates insertion of the strap through the adjacent slot 20.

Referring further to FIGS. 1–5, the locking head 14 comprises a somewhat bulbous structure having an upper surface 21, a lower surface 22, a pair of substantially parallel, planar side surfaces 24 and a pair of arcuate engaging surfaces 26 positioned and shaped to lie closely adjacent the items 12 when they are secured by the dual spacing clamp tie 10. In the illustrated embodiment, each engaging surface is positioned adjacent and below the juncture of a strap 16 with the locking head and generally conforms to the circular shape of the loop that is formed when the strap 16 is inserted through the slot 20 and pulled tight against the items 12 to be secured. It will be appreciated that the final diameter of the loop formed by each strap 16 depends on the size of the items 12 to be secured. If desired, each engaging surface can be shaped to match the anticipated size of the item 12 to be secured.

Figure 5:
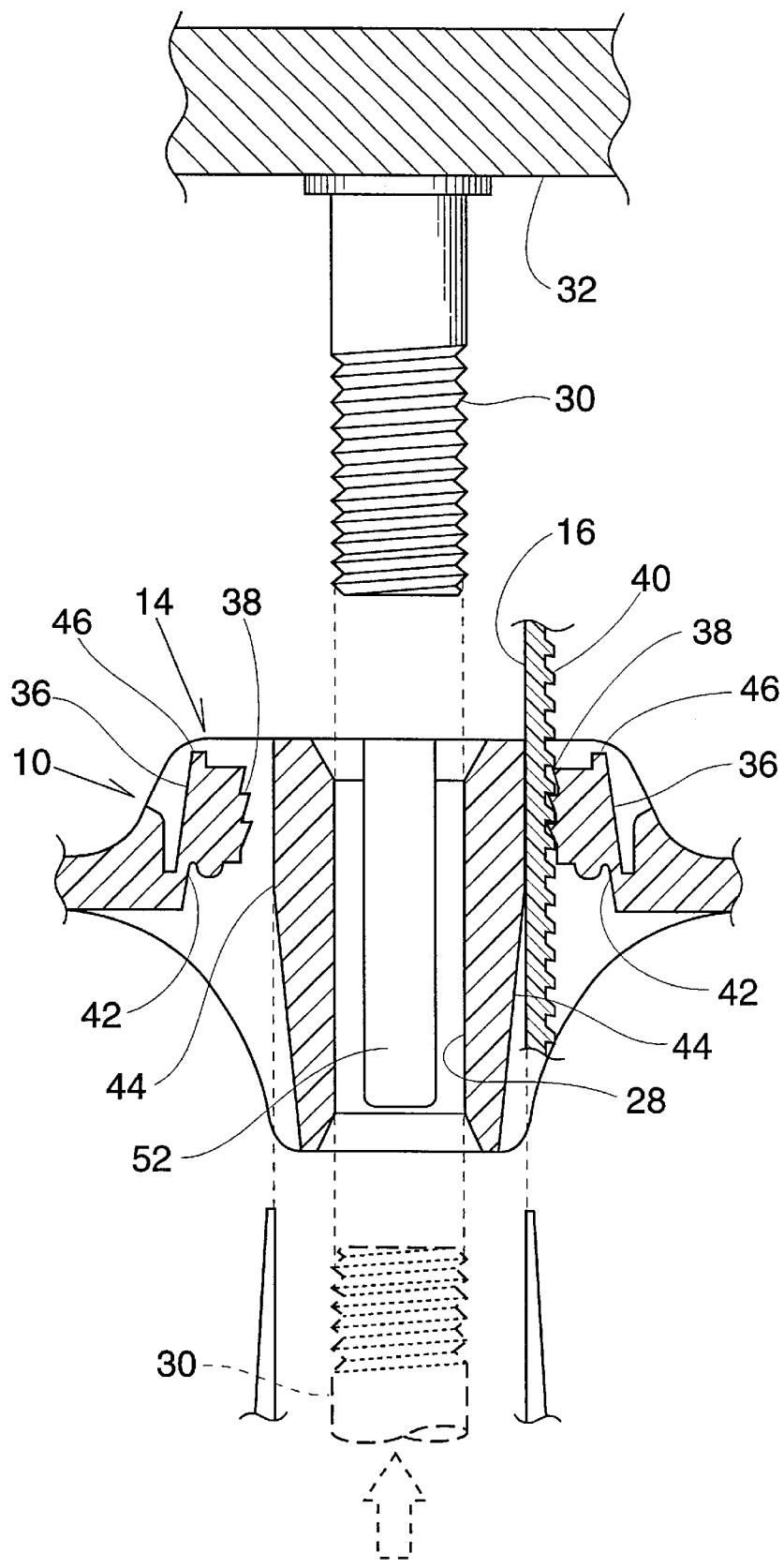
FIG. 5 is a cross-sectional view of the locking head shown in FIG. 4 taken along line 5—5 thereof, further showing the clamp tie mounted onto a supporting surface by means of a mounting stud or other fastener, and further showing a strap portion of the clamp tie locked within the locking head.
Figure 6:
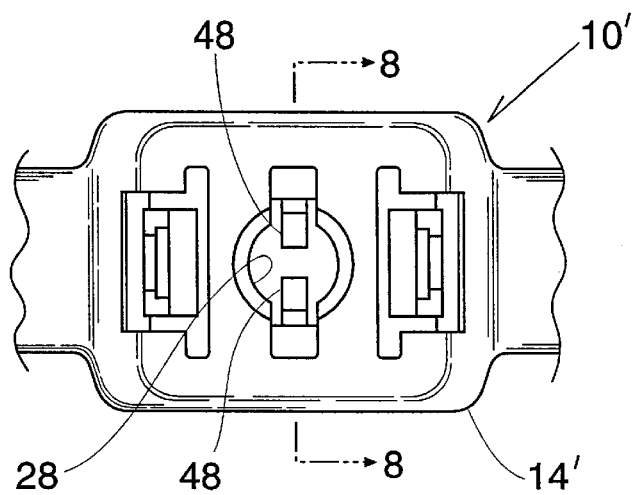
FIG. 6 is a top plan view of an alternate embodiment dual spacing clamp tie having bi-directional structure for facilitating installation of the clamp tie onto a mounting stud or fastener.
Figure 7:
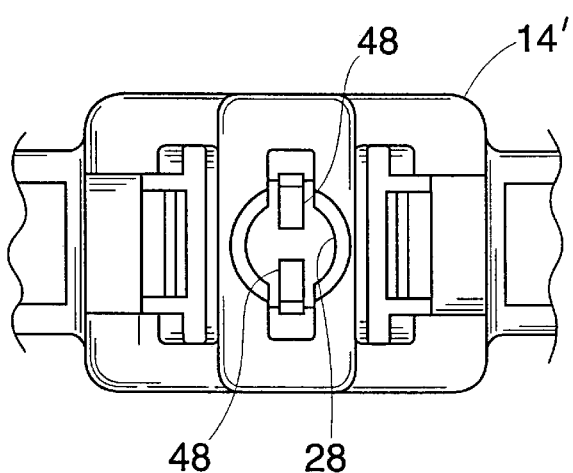
FIG. 7 is a bottom plan view of the alternate embodiment dual spacing clamp tie shown in FIG. 6.

The dual spacing clamp tie 10, in addition to securing items 12 to each other in parallel spaced relation, can also function to secure the items to another structure. To this end, the locking head 14 preferably includes a central aperture 28 extending through the locking head 14 between the slots 20. As best seen in FIG. 5, the central aperture 28 permits a mounting element, such as a threaded mounting stud 30, to extend through the locking head 14. In the illustrated embodiment, the mounting stud is welded to an underlying support or structure 32 such as, for example, a frame rail in a truck or other vehicle. In the views of FIGS. 4 and 5, the central aperture 28 is undersized relative to the stud 30 so that frictional engagement, such as an interference fit, with the threads of the stud 30 keeps the tie 10 firmly in place around the stud 30 and adjacent the supporting structure 32. As further shown in FIG. 5, the central aperture is preferably chamfered at each end and is of substantially uniform diameter so that the mounting stud 30 can pass through in either direction. This enables the tie 10 to be installed with either the upper surface 21 or lower surface 22 adjacent the supporting structure.

In accordance with one aspect of the invention, and as best seen in FIGS. 4 and 5, first and second pawl mechanisms are provided for securing the straps 16 within the locking head 14 and around the items 12 to be secured. As illustrated, each of the first and second pawl mechanisms includes a pawl 36 having a generally wedge or cammed shaped cross section. A forward surface of each pawl 36 is provided with a plurality of teeth 38 that engage complementary serrations 40 formed on the adjacent side of each strap 16 when the strap 16 is looped around the items to be secured and then inserted through the locking head 14.

As illustrated, each pawl 36 is carried at the end of an integrally formed hinge 42 that enables the pawl 36 to pivot relative to the locking head. Preferably, the pawls 36 are biased toward the strap 16 to pinch the strap 16 between the pawl 36 and the interior side wall 44 of each slot 20 when the strap 16 is inserted through the slot 20. This helps ensure intimate contact between the teeth 38 of the pawl 36 and the serrations 40 of the strap 16. Preferably, the teeth 38 of the pawl 36 and the serrations 40 on the strap 16 are ramped as shown. The ramped surfaces thus formed push the pawl 36 away from the strap 16 as the strap 16 is inserted through the slot 20 to facilitate insertion of the strap 16 through the slot 20. Withdrawing movement of the strap 16 relative to the slot 20, however, pulls the pawl 36 into stronger engagement with the serrations 40 of the strap 16 to resist such withdrawing movement and thereby secures the strap 16 within the slot 20 and around the items 12 to be secured.

Preferably, each of the first and second pawl mechanisms is releasable. To this end, a finger tab 46 is integrally formed on each pawl 36 and is accessible from the top of the locking head 14. By pulling the finger tab 46 away from the strap 16 with a fingernail, screwdriver or other device, the pawl 36 is pulled away from engagement with the strap 16. This releases the strap 16 thereby enabling the strap 16 to be withdrawn from the locking head 14 to free the secured items 12. In this manner, the dual spacing clamp tie 10 can be released and removed from the secured items 12. As best seen in FIGS. 1, 2 and 5, the upper end of each slot 20 widened adjacent the upper end of the locking head to provide sufficient clearance for the finger tab 46 and for releasing movement of the pawl 36.

In the embodiment shown in FIGS. 1–5, the diameter of the aperture 28 is slightly undersized relative to the diameter of the mounting element 30 so that a friction fit (i.e. interference fit) or engagement results when the locking head 14 is pressed onto the mounting element 30. As an example, making the diameter of the aperture 28 approximately five per-cent smaller than the diameter of the mounting element 30 has been found to give satisfactory results. Friction between the interior side walls of the aperture 28 and the mounting element 30 is sufficient to keep the tie 10 in place on the mounting element 30.

Preferably, the ends of the aperture 28 are chamfered as shown to facilitate insertion of the mounting element 30 through the aperture from either direction. Additionally, two parallel, diametrically opposed slots 52 are formed in the side walls of the aperture 28. These slots reduce the material needed to form each tie 10 help create a substantially uniform wall thickness in the tie 10 that avoids sinks created as the material from which the tie 10 is formed cools following molding.

Figure 8:
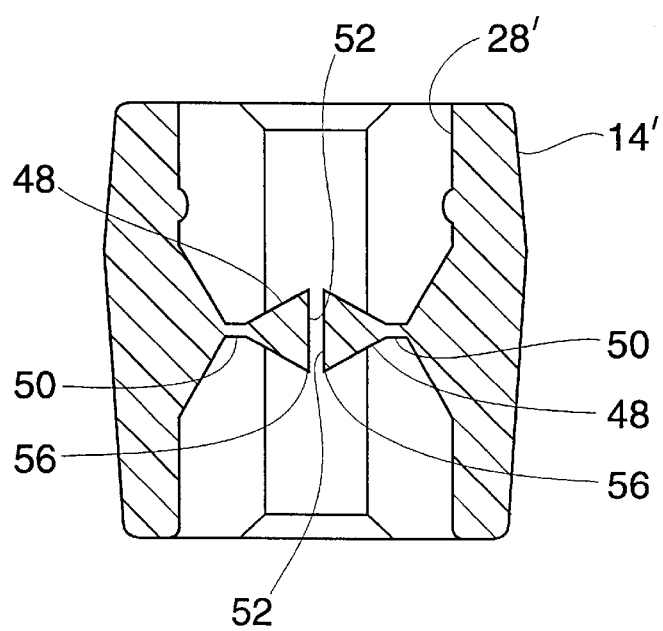
FIG. 8 is a cross-sectional view of the alternate embodiment locking head shown in FIG. 6 taken along line 8—8 thereof.
Figure 9:
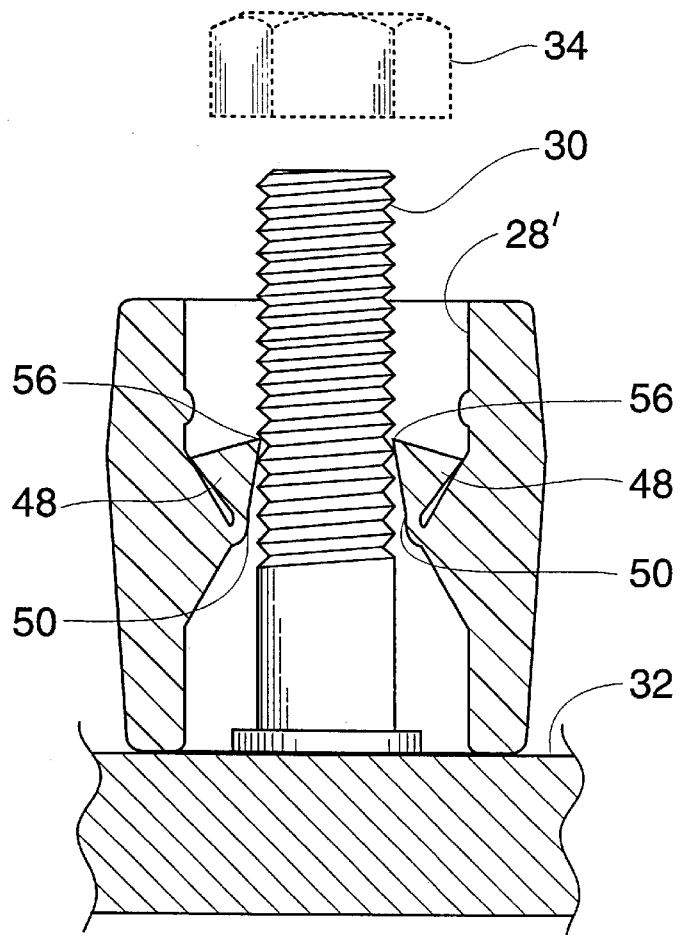
FIG. 9 is a partial sectional view of the alternate embodiment shown in FIG. 8 showing the dual spacing clamp tie mounted onto a supporting surface by means of a mounting stud or other fastener.
Figure 10:
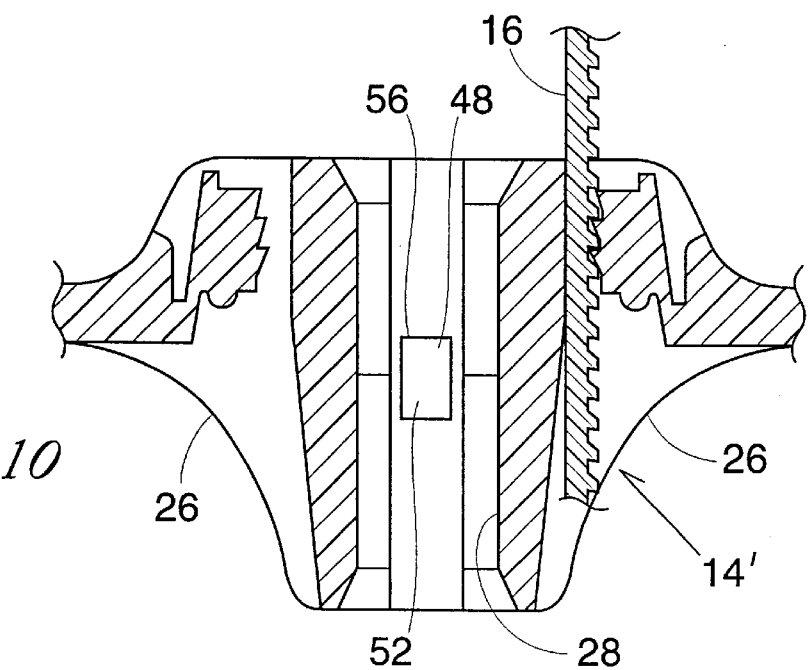
FIG. 10 is a sectional view of the locking portion of the alternate embodiment dual spacing clamp tie of FIGS. 8 and 9 showing a strap portion of the clamp tie locked within the locking head.

An alternate embodiment of dual spacing clamp tie 10' having a self retaining feature is illustrated in FIGS. 6–10. In this embodiment, the central aperture 28' is of sufficient size to easily pass the mounting element 30 (FIG. 9) a third pawl mechanism is provided in the aperture 28' for engaging the mounting element 30 and retaining the dual spacing clamp tie 10' on the mounting element 30. The third pawl mechanism, which is best seen in FIGS. 8 and 9, includes a pair of additional pawls 48 positioned diametrically opposite each other across the aperture 28'. Each pawl 48 comprises a substantially triangularly shaped member carried at the end of an elongate hinge 50. The side walls of the aperture 28' slope inwardly toward each other as shown in the vicinity of the pawls 48. The pawls 48 lie closely adjacent each other (FIG. 8) when the mounting element 30 is not present in the aperture 28'. Additionally, the pawls 48 are oriented as shown in FIG. 8 with their vertical flat surfaces 52 spaced from and facing each other. When so oriented, the pawls operate to permit passage of the mounting element 30 in either direction through the aperture 28' and thereafter to resist withdrawing movement of the mounting element 30 in the opposite direction through the aperture 28'. This enables the dual spacing clamp tie 10' to be pressed onto the mounting element 30 from either side with relatively little effort while nevertheless retaining the dual spacing clamp tie 10' onto the mounting element 30.

As best seen in FIG. 9, passage of the mounting element 30 through the aperture 28' deflects the pawls 48 as shown. The pawls 48 pivot around their respective hinges so that the outermost points 56 of the pawls engage the mounting element 30 thereby causing a wedge lock condition between the aperture 28' and pawl 48. If the mounting element 30 is threaded as shown, the points 56 engage the threads to help secure and retain the dual spacing clamp tie 10 to the mounting element 30. Withdrawing motion of the mounting element 30 thereafter tends to wedge the pawls 48 between the mounting element 30 and the tapered side walls of the aperture 28' to further lock the dual spacing clamp tie 10' to the mounting element 30.

If desired, an additional fastener, such as a nut 34 (FIG. 9) can be used with either tie 10 or 10' to effect a more secure attachment between the tie and the supporting surface 32.

Further embodiments of the present invention include various modifications of the pawl mechanisms residing in the mounting element aperture as will hereinafter be described in connection with the illustrated views of FIGS. 11–20. In each case, the outer configuration of the locking head 14 is similar as well as is the size of the central aperture 28' (i.e. the central aperture 28' is of sufficient size to easily pass the mounting element 30 therethrough).

Figure 11:
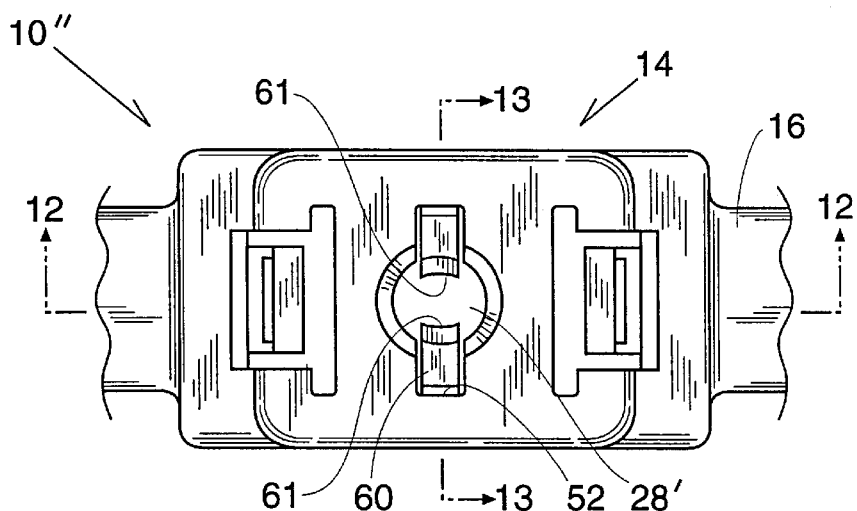
FIG. 11 is a top plan view of an alternate embodiment dual spacing clamp tie having structure for facilitating one-way installation of the clamp tie onto a mounting stud or other fastener.
Figure 12:
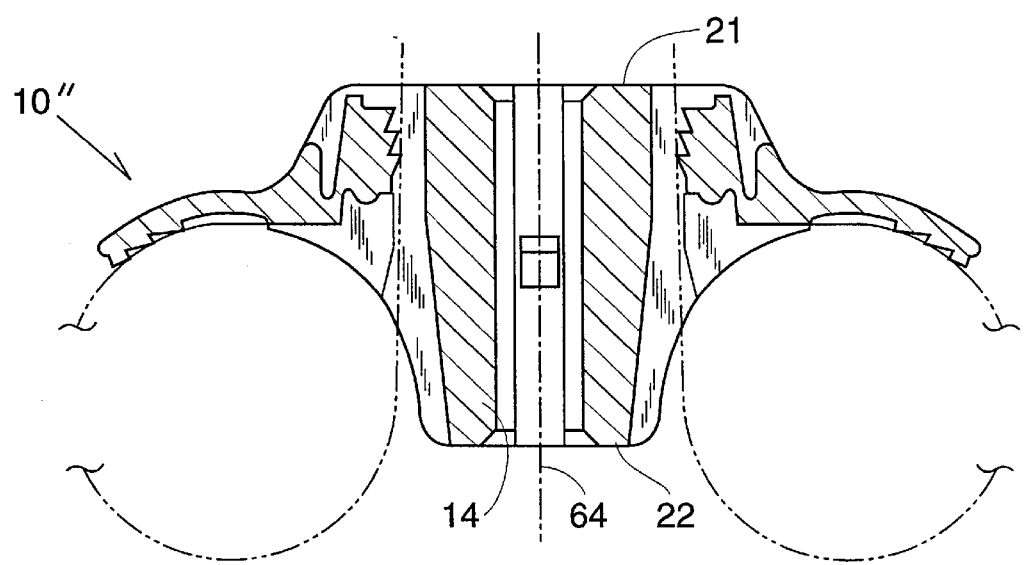
FIG. 12 is a cross-sectional view of the alternate embodiment shown in FIG. 11 taken along line 12—12 thereof.
Figure 13:
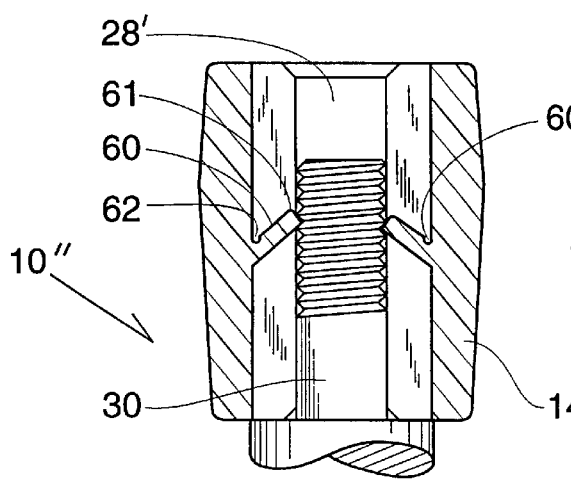
FIG. 13 is a cross-sectional view, similar to FIG. 12, but taken along line 13—13, showing the alternate embodiment mounted in place on a mounting stud or other fastener.

An alternate embodiment of the dual spacing clamp tie 10" is shown in FIGS. 11–13. In this embodiment, the clamp tie 10" is configured for one-way mounting onto a mounting element 30. To this end, a pair of angled pawls 60 project inwardly into the aperture 28'. As illustrated, the pawls 60 are substantially straight and located diametrically opposite each other in the aperture 28'. Each includes a hinge portion 62 formed by a transverse groove or reduced thickness area adjacent the juncture of each pawl 60 with locking head 14. Preferably, the pawls 60 are hinged from the locking head 14 within the slots 52. Although not specifically illustrated, it is within the province of the invention to provide any number of pawls 60 projecting inwardly onto aperture 28'.

In the illustrated embodiment, the pawls 60 are angled upwardly toward the upper surface 21 of the locking head 14 and are thus oriented obliquely relative to the central axis 64 of the head 14. Accordingly, when the locking head 14 is pressed downwardly onto the mounting element 30 with the upper surface 21 uppermost, the pawls 60 deflect away from the element 30 to permit passage of the element 30 through the aperture 28'. Thereafter, the distal ends 61 of the pawls 60 engage the threads of the element 30 as best seen in FIG. 13 to resist withdrawing movement of the element 30 relative to the clamp tie 10". It will be appreciated that so long as the clamp tie 10", the pawls 60 and the mounting element 30 are oriented and positioned as illustrated in FIG. 13, the pawls 60 will be effective to resist withdrawing movement of mounting element 30. However, if an attempt is made to install the clamp tie 10" onto the mounting element 30 in the reverse manner, i.e., with the upper surface 21 facing toward the element 30, the pawls 60 will resist passage of the element 30 through the aperture 28'. This helps ensure that the clamp tie 10" can be installed onto the mounting element 30 in only one direction. It will also be appreciated that, by angling the pawls 60 in the opposite direction, the clamp tie 10" can be installed or assembled to the mounting element 30 extending through the aperture 28' in the opposite direction.

Figure 14:
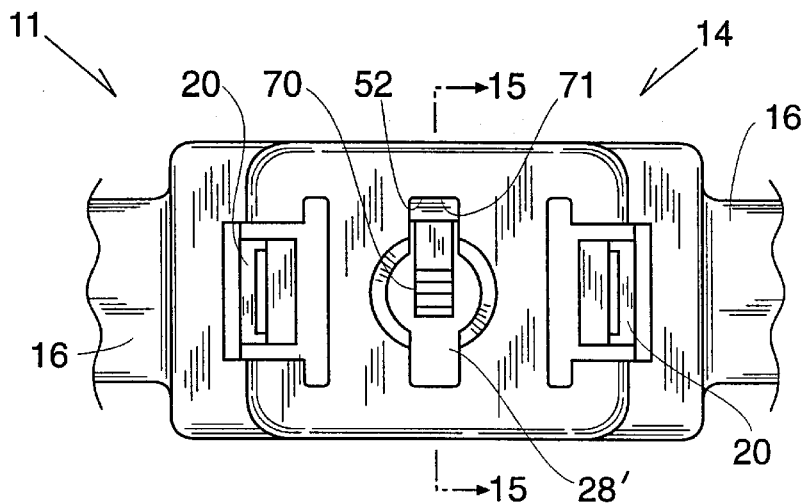
FIG. 14 is a top plan view of an alternative embodiment dual spacing clamp tie having bi-directional structure for facilitating installation of the clamp tie onto a mounting stud or other fastener.
Figure 15:
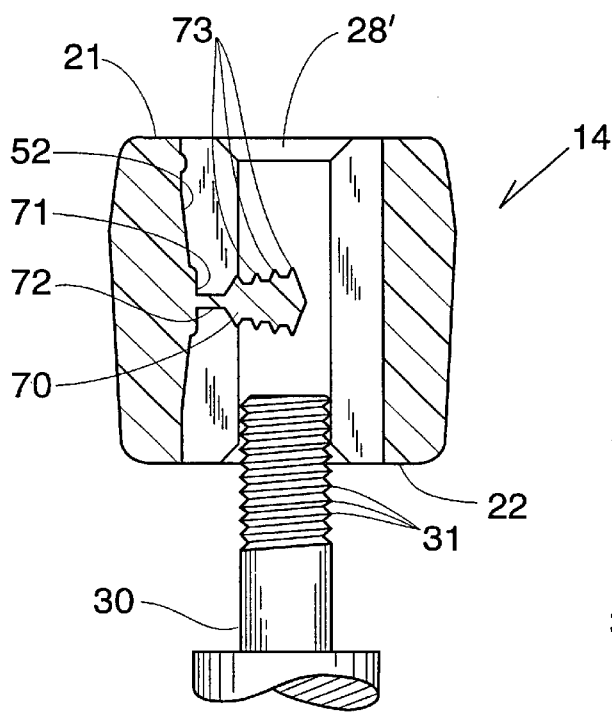
FIG. 15 is a cross-sectional view of the alternate embodiment taken along line 15—15 of FIG. 14 showing the mounting element entering the aperture of the locking head.
Figure 16:
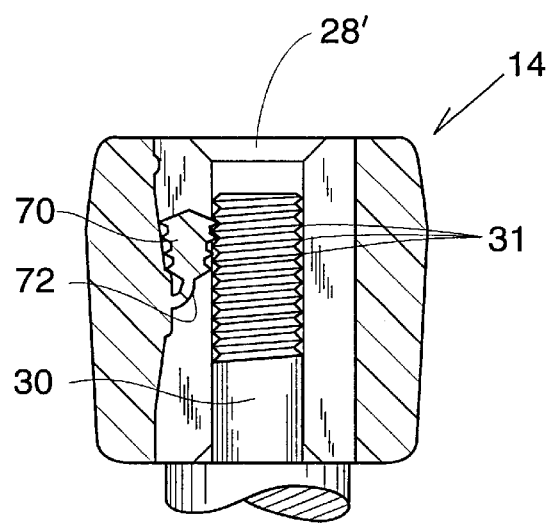
FIG. 16 is a cross-sectional view of the alternate embodiment taken along line 15—15 of FIG. 14 and further showing the mounting element fully engaged with the locking head and with the teeth of the locking pawl protruding inwardly from the wall surface of the aperture.
Figure 21:
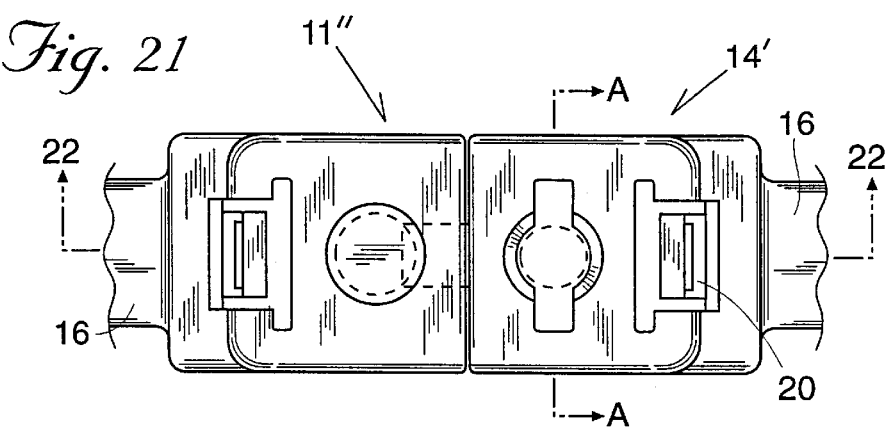
FIG. 21 is a top plan view of another alternative embodiment dual spacing clamp tie having structure for bifurcated rotational movement.

Another alternate embodiment of the dual spacing clamp tie 11 is shown in FIGS. 14–16. It will be apparent that the pawl 70 in this embodiment protrudes from a shoulder 71 formed within the slot 52 of the aperture 28'. The pawl 70 is configured to provide a series of stepped teeth longitudinally spaced to engage with a series of threads 31 on the mounting element 30. It will be noted that the pawl 70 includes a hinge section 72. With particular reference to the view of FIG. 16, it will be observed that the hinge section 72 is of sufficient flexibility and length to permit the pawl 70 to fold upwardly and against shoulder 71 thereby tightly engaging the threads 31 and providing a secure engaged fit. The engaged fit between the pawl 70 and mounting element 30 resists withdrawing movement.

It should also be noted that the orientation of pawl 70 permits passage of the mounting element 30 in either direction through the aperture 28' and thereafter resists withdrawing movement of the mounting element 30 in the opposite direction through aperture 28'. This enables the dual spacing clamp tie 11 to be pressed onto the mounting element 30 from either side with relatively little effort. The symmetrical structure of the pawl 70, as well as the formation of an identical shoulder 71 on the opposite side of the hinge section 72, allows the dual spacing clamp tie 11 to be retained onto the mounting element 30 regardless of the clamp tie orientation. In other words, the clamp tie is bi-directional with respect to the mounting element 30. The clamp tie 11 can be installed or mounted from either the top or bottom of the head 14.

Another alternate embodiment of the clamp tie 11' is shown in the views of FIGS. 17–20. It will be apparent in this embodiment that a pair of pawls 80 protrude from the inner wall 81 in the slot 52 of the aperture 28'. It will be noted that each pawl 80 includes a hinge portion 82 integrally molded with the wall 81 of aperture 28'. Each pawl 80 at pawl section 83 has spaced teeth 84 and 84', which define an intermediate root 85 (i.e. the root 85 is formed between the spaced teeth 84 and 84'). The root 85 engages with the crest 86 of a thread in a series 31 on the stud 30. FIG. 18 illustrates the initial entry of the stud 30 into the aperture 28'. The geometry of teeth 84 and 84' and the hinge 82 allow them to ride over the threads 31 as the head 14 is inserted over stud 30 as shown. When the direction of the head 14 is reversed, at least one of the teeth 84 and 84' is engaged with threads 31 and the pawl 80 is bent downwardly as shown in FIG. 19. Now referring to FIG. 20, when a sufficient force is exerted upon the head 14 the hinge portion 82 collapses and the lobe portion 83' exerts a force or pushed against the wedge ramp 81'. In this wedged condition, the head 14 cannot be removed from the mounting stud 30. This feature aids in the ultimate securement of the inter-fitting elements as this engagement resists withdrawing movement of the head 14.

Figure 22:
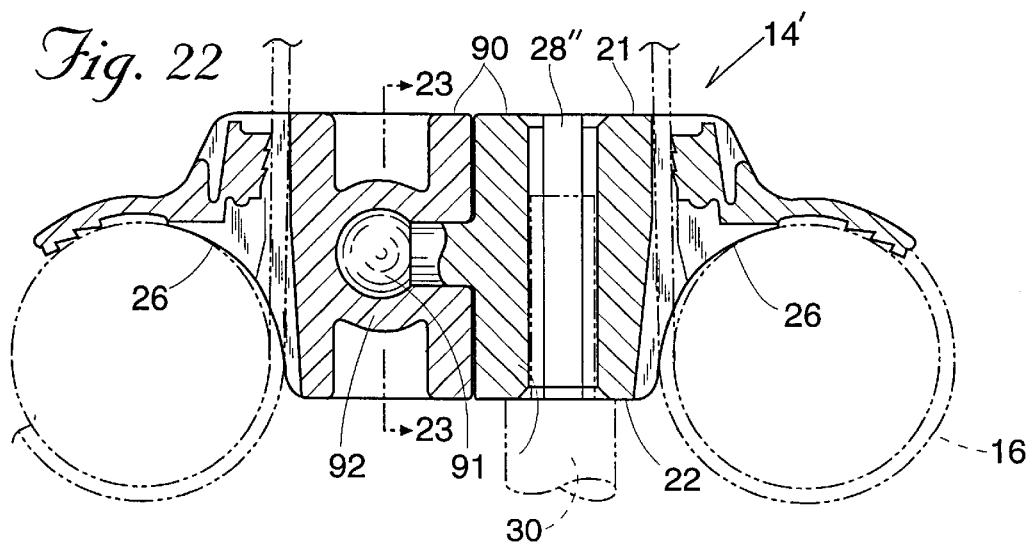
FIG. 22 is a cross sectional view of the alternative embodiment taken along line 22—22 of FIG. 21, wherein the cooperating elements are shown in interlocking relationship.
Figure 23:
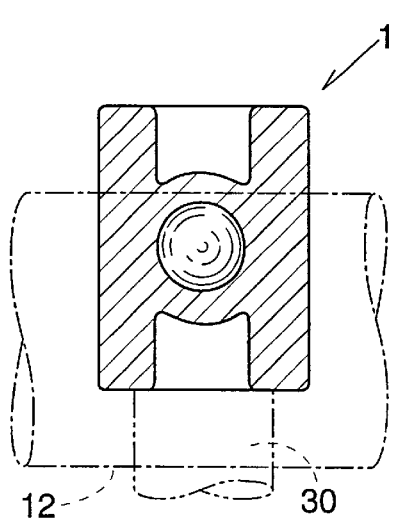
FIG. 23 is a cross-sectional view of the alternative embodiment, partially in phantom taken along line 23—23 of FIG. 22 showing rotatable, adjacent members in aligned position.
Figure 24:
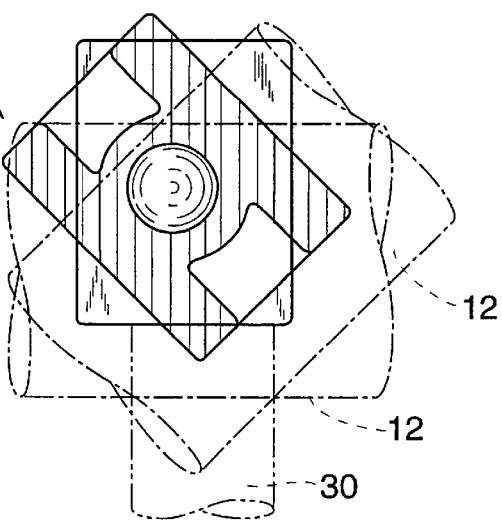
FIG. 24 is a cross-sectional view similar to the view shown in FIG. 23, wherein the cooperating elements of FIGS. 21 and 22 are shown in relative rotation with respect to one another.
Figure 25:
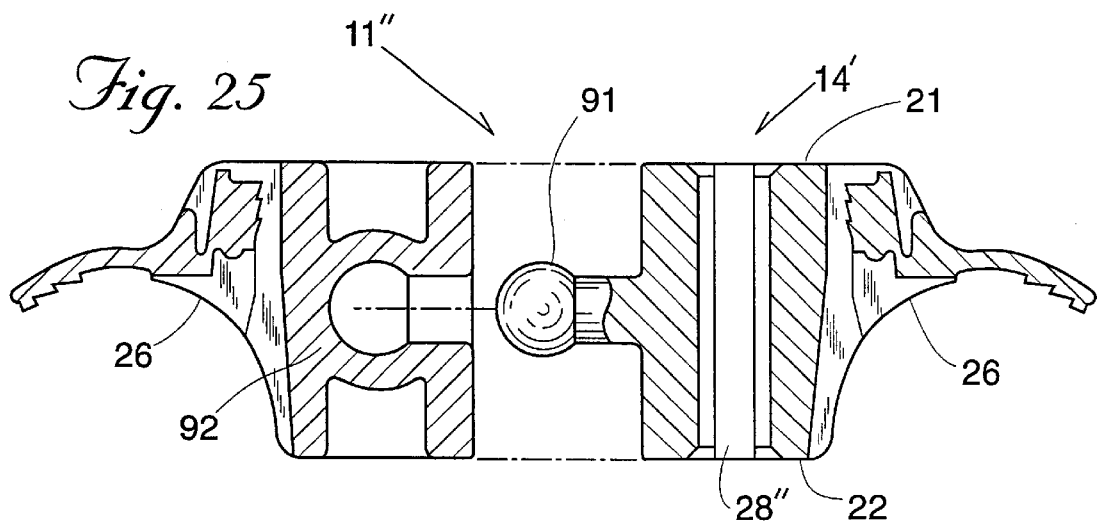
FIG. 25 is an exploded view of the alternative embodiment including the bifurcated locking head containing two relatively rotatable, adjacent members.
Figures 26, 27:
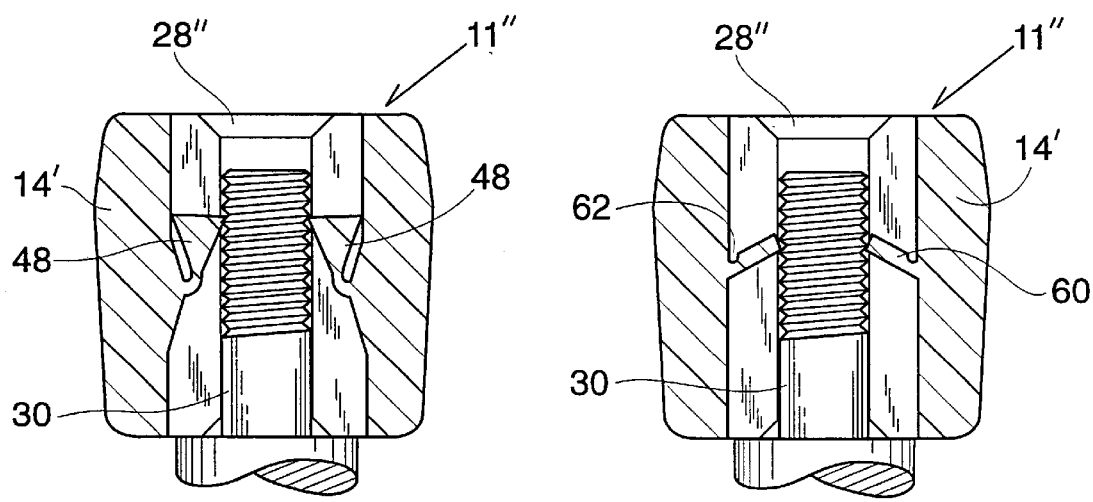
FIG. 26 is a cross-sectional view taken along line A—A of FIG. 21, wherein triangular pawls engage the mounting element.
FIG. 27 is an alternative cross-sectional view taken along line A—A of FIG. 21, wherein angled pawls engages the mounting element.
Figure 28:
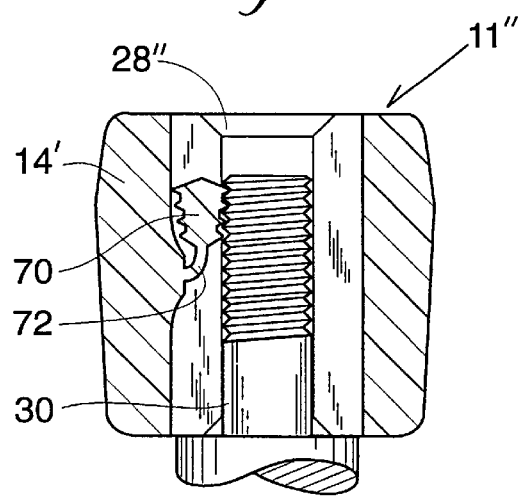
FIG. 28 is an alternative cross-sectional view taken along line A—A of FIG. 21, wherein a bidirectional pawl having a series of longitudinally stepped teeth engage the mounting element.
Figure 29:
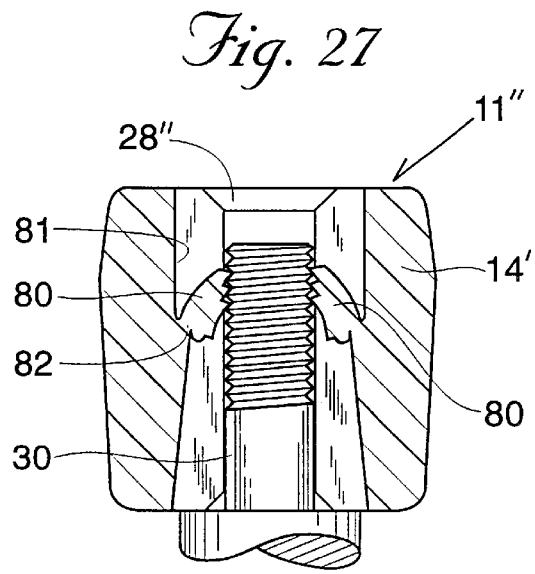
FIG. 29 is an alternative cross-sectional view taken along line A—A of FIG. 21, wherein a pair of pawls engageable with the crest of a thread engage the mounting element.

With particular reference to FIGS. 21–25, a further embodiment of the invention, shown generally at 11", provides for bifurcation of the locking head into a pair of rotationally relative members having interlocking means for permitting angular displacement relative to one another. It will be noted that the locking head 14 may be bifurcated, yet adjoined, to provide for rotational movement relative to the bifurcated portions. The bifurcated head 14' is comprised of a set of interlocking members 90 having an inter-fitting male member 91, and a female receptor 92. FIG. 22 is shown with interlocking members 91 and 92 in normal adjoining relationship. With particular regard to FIG. 24 it will be apparent that the bifurcated head 14' may be rotated relative to the inter-fitting members 91 and 92 to allow for more diverse applications in which elongate items 12 are to be mounted in other than substantially parallel relationship. The view of FIG. 25 depicts the interlocking members 91 and 92 disengaged from one another to more fully illustrate their cooperating relationship.

As best shown in FIGS. 26–29, any of the aforementioned pawls 48, 60, 70, and 80 can be mounted in the aperture 28" of the bifurcated locking head 14'. The pawls 48, 60, 70, or 80 engage a mounting element 30. Although not depicted, it is to be understood that the aperture 28" of bifurcated head 14' may also provide an interference fit or a clearance fit with a mounting element 30.

Preferably, the dual spacing clamp ties 10, 10', 10", 11, and 11' each comprise a single, unitary element that is economically injection molded from a suitable thermoplastic material using known fabrication techniques. It will be appreciated that the size and shape of the dual spacing clamp tie 10 can be modified to suit particular items 12 and applications. In particular, it will be appreciated that the distance between the article engaging surfaces 26 can be selected to maintain a desired fixed spacing between the articles 12 that are secured. Additionally, the dimension between the upper and lower surfaces 21 and 22 of the locking head 14' can be selected to provide a desired clearance for the secured articles 12 relative to the supporting surface 32. Accordingly, it will be appreciated that the particular design features of the embodiment shown and described are meant to be illustrative rather than limiting.

Additionally, the interlocking members 91 and 92 of the dual spacing clamp tie 11" each comprise a single, unitary element that is economically injection molded from a suitable thermoplastic material using known fabrication techniques. The members 91 and 92 may be molded separately and then snapped together or they may be molded integrally using different plastic resins having different melting points and cure times. Alternatively, the male member 91 may be molded first. After male member 91 is inserted into a second mold, female member 92 is subsequently molded in the second mold. The same or a different plastic resin may be used with this technique.

While a particular embodiment of the invention has been shown and described, it will be obvious to those skilled in the art that changes and modifications can be made without departing from the invention in its broader aspects, and, therefore, the aim in the appended claims is to cover all such changes and modifications as fall within the true spirit and scope of the invention.

What is claimed is:

1. A dual spacing clamp tie comprising:
    a unitary member including:
        a single locking head including a pair of laterally spaced apertures,
        a pair of straps extending in opposite directions from the locking head,
        a first pawl mechanism contained within one of said locking head apertures for engaging and retaining one of the straps,
        a second pawl mechanism contained within the other of said locking head apertures for engaging and retaining the other of the straps,
        said locking head including a third aperture located intermediate said pair of laterally spaced apertures and for receiving a mounting element therethrough, and
        structure for facilitating insertion of the mounting element into the aperture from one end only and for engaging the mounting member to secure the locking head to the mounting element.

2. A dual spacing clamp tie as defined in claim 1 wherein the structure comprises an additional pawl mechanism operable to permit movement of the mounting element in a first direction through the aperture and to resist movement of the mounting element in the opposite direction through the aperture.

3. A dual spacing clamp tie as defined in claim 2 wherein the additional pawl mechanism includes a distal end point located within the aperture, and wherein said pawl mechanism includes an innermost portion proximate to the wall surface defining said aperture.

4. A dual spacing clamp tie as defined in claim 2 wherein the aperture includes a central axis and wherein said additional pawl mechanism is oriented obliquely relative to the central axis of the aperture.

5. A dual spacing clamp tie as defined in claim 2 wherein the additional pawl mechanism includes a pair of opposed pawls located substantially opposite one another within the aperture.

6. A dual spacing claim tie as defined in claim 2 wherein the additional pawl mechanism includes a pawl extending inwardly of said third aperture and includes a plurality of longitudinally spaced teeth.

7. A dual spacing clamp tie as defined in claim 1 wherein said structure for facilitating insertion of the mounting element allows for insertion from one end only.

8. A dual spacing clamp tie as defined in claim 1 wherein said unitary structure is formed of injection molded plastic.

9. A dual spacing clamp tie as defined in claim 8 wherein the aperture includes a central axis and each of said opposed pawls is angled relative to the central axis.

10. A dual spacing clamp tie as defined in claim 9 wherein the dual spacing clamp tie comprises a unitary structure formed of injection molded plastic.

11. A dual spacing clamp tie as defined in claim 10 wherein the third pawl mechanism includes a distal end point located within the aperture and wherein said pawl mechanism includes an innermost portion proximate to the wall surface defining said aperture.

12. A dual spacing clamp tie as defined in claim 11 wherein the dual spacing clamp tie comprises a unitary structure formed of injection molded plastic.

13. A dual spacing clamp tie as defined in claim 12 wherein the aperture includes a central axis and each of said opposed pawls is angled relative to the central axis.

14. A dual spacing clamp tie as defined in claim 10 wherein the third pawl mechanism includes a pair of opposed pawls located substantially opposite one another within the aperture.

15. A dual spacing clamp tie as defined in claim 14 wherein the dual spacing clamp tie comprises a unitary structure formed of injection molded plastic.

16. A dual spacing clamp tie as defined in claim 15 wherein the aperture includes a central axis and each of said opposed barbs is angled relative to the central axis.

17. A dual spacing clamp tie as defined in claim 10 wherein the third pawl mechanism includes a plurality of barbs located within the aperture.

18. A dual spacing clamp tie as defined in claim 17 wherein the dual spacing clamp tie comprises a unitary structure formed of injection molded plastic.

19. A dual spacing clamp tie for securing elongate items adjacent a mounting member in spaced substantially parallel relationship to each other, comprising:

a locking head having a pair of arcuate surfaces for engaging the items and further having an aperture for receiving therethrough the mounting member, a pair of straps extending in opposite directions from the locking head and insertable through the locking head to form a loop in conjunction with each of the arcuate surfaces, a first pawl mechanism within the locking head for engaging and retaining one of the straps in looped relationship with the locking head and one of the arcuate surfaces, a second pawl mechanism within the locking head for engaging and retaining the other of the straps in looped relationship with the locking head and the other of the arcuate surfaces, and a third pawl mechanism within the aperture for permitting movement of the mounting element in a predetermined direction therethrough while resisting movement of the mounting element in the opposite direction and for engaging and retaining the mounting element within the aperture.

20. A dual spacing clamp tie as defined in claim 19 wherein the aperture includes a central axis and wherein said third pawl mechanism is oriented obliquely relative to the central axis of the aperture.

21. A dual spacing clamp tie comprising:

a bifurcated locking head including adjoining rotatable members and wherein each of said adjoining members is apertured, a pair of straps extending in opposite directions from the bifurcated locking head, a first pawl mechanism contained within one of said apertured adjoining members for engaging and retaining one of the straps, a second pawl mechanism contained within the other of said apertured adjoining members for engaging and retaining the other of the straps, and said bifurcated locking head including a third aperture located intermediate said adjoining members and for receiving a mounting element therethrough.

22. A dual spacing clamp tie as defined in claim 21 wherein individual straps of said pair of straps extend laterally from a respective adjoining member of said bifurcated locking head.

23. A dual spacing clamp tie comprising:

a bifurcated locking head including adjoining members and wherein each of said adjoining members is apertured, a pair of straps extending in opposite directions from the bifurcated locking head, a first pawl mechanism contained within one of said apertured adjoining members for engaging and retaining one of the straps, a second pawl mechanism contained within the other of said apertured adjoining members for engaging and retaining the other of the straps, said bifurcated locking head including a third aperture located intermediate said adjoining members and for receiving a mounting element therethrough, a first structure for facilitating insertion of the mounting element into the aperture and for engaging the mounting element to secure the bifurcated locking head to the mounting element, and a second structure for allowing relative rotational, movement of the adjoining members of the bifurcated locking head.

24. A dual spacing clamp tie as defined in claim 23 wherein said structure for allowing rotational movement includes a set of interlocking members.

25. A dual spacing clamp tie as defined in claim 24 wherein the additional pawl mechanism includes a pair of opposed, triangularly shaped pawls carried at the ends of two elongate hinges disposed substantially diametrically opposite each other within the aperture.

26. A dual spacing clamp tie as defined in claim 24 wherein said interlocking members include an inter-fitting male member and a female receptor.

27. A dual spacing clamp tie as defined in claim 26 wherein said male member includes a spherical portion and said female receptor includes a mating concave surface.

28. A dual spacing clamp tie as defined in claim 23 wherein the first structure engages the mounting member.

29. A dual spacing clamp tie as defined in claim 23 wherein the first structure engages the mounting member.

30. A dual spacing clamp tie as defined in claim 23 wherein the first structure comprises a through hole.

* * * * *